(12) United States Patent  
Nourbakhsh

(10) Patent No.: US 8,976,720 B2  
(45) Date of Patent: Mar. 10, 2015

(54) TECHNIQUE OF CONTROLLING DISCONTINUOUS TRANSCEIVING OPERATIONS

(75) Inventor: Seyed-Hami Nourbakhsh, Nuremberg (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 405 days.

(21) Appl. No.: 13/522,535

(22) PCT Filed: Jan. 18, 2010

(86) PCT No.: PCT/EP2010/000258  
§ 371 (c)(1),  
(2), (4) Date: Sep. 6, 2012

(87) PCT Pub. No.: WO2011/085740  
PCT Pub. Date: Jul. 21, 2011

(65) Prior Publication Data  
US 2012/0320810 A1 Dec. 20, 2012

(51) Int. Cl.  
*G08C 17/00* (2006.01)  
*H04W 52/02* (2009.01)  
*H04W 76/04* (2009.01)

(52) U.S. Cl.  
CPC ........ *H04W 52/0235* (2013.01); *H04W 76/048* (2013.01); *Y02B 60/50* (2013.01)  
USPC .......................................... 370/311; 455/574

(58) Field of Classification Search  
CPC ............................... H04W 52/00; H04W 76/00  
USPC .......................................... 370/311; 455/574  
See application file for complete search history.

(56) References Cited

U.S. PATENT DOCUMENTS

| | | | |
|---|---|---|---|
| 8,131,310 B2* | 3/2012 | Womack et al. | 455/466 |
| 8,238,281 B2* | 8/2012 | Pelletier et al. | 370/311 |
| 8,483,624 B2* | 7/2013 | Cai et al. | 455/73 |
| 2009/0093281 A1* | 4/2009 | Demirhan et al. | 455/574 |

FOREIGN PATENT DOCUMENTS

WO 2009033253 A1 3/2009

OTHER PUBLICATIONS

3rd Generation Partnership Project. "3rd Generation Partnership Project; Technical Specification Group Radio Access Network; Continuous Connectivity for Packet Data Users (Release 9)." 3GPP TR 25.903, V9.0.0, Dec. 2009, pp. 1-138, Sophia Antipolis Valbonne, France.

* cited by examiner

*Primary Examiner* — Andrew Lai  
*Assistant Examiner* — Sumitra Ganguly  
(74) *Attorney, Agent, or Firm* — Coats & Bennett, PLLC

(57) ABSTRACT

A technique for controlling transceiving operations of a transceiver device in a wireless communication network is described. A method implementation of this technique comprises the following steps performed by the transceiver device: determining a temporal mismatch between DTX characteristics and DRX characteristics of the transceiver device; and adjusting at least one of the DTX characteristics and the DRX characteristics such that DTX pauses become essentially aligned with DRX pauses. During the overlapping inactivity periods of the DTX pauses and the DRX pauses power management measures may be initiated by the transceiver device.

25 Claims, 8 Drawing Sheets

TECHNIQUE OF CONTROLLING DISCONTINUOUS TRANSCEIVING OPERATIONS

TECHNICAL FIELD

The present disclosure generally relates to the control of transmitting and receiving operations ("transceiving operations"). In particular, a technique for controlling discontinuous transmission and discontinuous reception is proposed.

TECHNICAL BACKGROUND

Radio Resource Management (RRM) is used in modern wireless communication networks to optimize the network capacity while at the same time achieving a high network performance from the perspective of a user terminal. RRM comprises multiple functionalities at different protocol layers of the telecommunication network. The RRM functionalities include, among others, power control (Layer 1), link adaptation (Layer 2) and admission control (Layer 3).

Discontinuous transmission (DTX) and discontinuous reception (DRX) are measures that may beneficially be implemented in the RRM context or in similar contexts such as the management of power resources. In general, DTX and DRX help to minimize the power consumption of user devices and, in the case of battery-operated user devices, to maximize their operating times.

As an example of a DRX scheme, the $3^{rd}$ Generation Partnership Project (3GPP) defines in its Long Term Evolution (LTE) specifications micro-sleep periods during the active state of a user device. In the micro-sleep periods the user device refrains from monitoring the Physical Downlink Control Channel (PDDCH) for given subframes and enters a power saving mode instead.

FIG. 1 schematically illustrates a DRX cycle as defined in Section 3.1 of 3GPP Technical Specification (TS) 36.321 V.8.7.0 of September 2009. In brief, each DRX cycle comprises a so-called On-Duration as well as an idle period following the On-Duration. The DRX idle period can be considered as a pause that provides an opportunity for initiating power saving measures.

SUMMARY

While the provision of DRX pauses as such is beneficial, there is a need for a technique that allows for a more efficient resource management in a wireless communication network.

According to a first aspect, a method of controlling a transceiver device of a wireless communication network is provided. The method is performed by a network device and comprises the steps of determining a temporal mismatch between DTX characteristics and DRX characteristics of the transceiver device and controlling the transceiver device to adjust at least one of its DTX characteristics and its DRX characteristics such that DTX pauses become essentially aligned with DRX pauses.

The alignment of the DTX and DRX pauses may result in a temporal synchronization of the DTX and DRX pauses according to the prevailing DTX and DRX characteristics. The alignment of the DTX and DRX pauses may be performed by synchronizing the timing and/or the length of DTX and/or DRX cycles. As a result of the synchronization, the period of time during which certain resource management measures can be initiated may be maximized.

The DTX characteristics and the DRX characteristics may be defined or set by one or more parameters. Such parameters may include one or more of the length and/or of active and idle periods in reception and transmission schemes, the length and/or timing of any DTX and DRX cycles, and so on.

The DTX pauses and the DRX pauses may be idle periods provided in a reception scheme and a transmission scheme, respectively, that may be exploited for initiating power saving or other measures. The provision of such pauses is independent from the actual initiation of, for example, power saving measures. In other words, once the DTX and DRX pauses have been aligned, it may require a separate decision (e.g., on the side of the transceiver device) whether or not any power saving measure is actually carried out. On the other hand, power saving measures may also be implemented in the case of mis-aligned DTX and DRX pauses.

In the context of the present disclosure, the terms DTX, DRX, uplink and downlink are always used from the perspective of the transceiver device. Accordingly, the uplink direction denotes the direction from the transceiver device to the network device, whereas the downlink direction refers to the opposite direction.

One of the DTX characteristics and the DRX characteristics may be selected as reference characteristics, and the reference characteristics may form the basis for aligning the DTX pauses and the DRX pauses. In one example, the DTX characteristics define the reference characteristics, so that the transceiver device may be controlled to adjust its DRX characteristics relative to its DTX characteristics. For example, the DTX characteristics may remain unchanged, whereas the DRX characteristics are adjusted to align the DRX pauses with the (unchanged) DTX pauses.

The step of determining the temporal mismatch may comprise receiving a mismatch indication signal from the transceiver device. The mismatch indication signal may be a dedicated signal or a signal portion comprised by another signal (e.g., in a report or a request signal). The temporal mismatch signalled via the mismatch indication signal could also be zero, thus indicating to the network device that no temporal mismatch exists. In one variant, the mismatch indication signal is received periodically from the transceiver device while the transceiver device is in an active state. According to another variant, the mismatch indication signal has an aperiodic occurrence (e.g., it may be received only once from the transceiver device).

The transceiver device may be controlled to adjust at least one of its DTX characteristics and its DRX characteristics based on the mismatch indication signal. For example, the content of the mismatch indication signal may be evaluated by the network device in a first step. In a second step the transceiver device may then be controlled based on the result of this evaluation.

The mismatch indication signal may be indicative of one or more items of information pertaining to the temporal mismatch. As an example, the mismatch indication signal may be indicative of a direction of the mismatch between the DTX characteristics and the DRX characteristics. Such a mismatch direction may be specified relative to a reference characteristics. The reference characteristics may be any one of the DTX characteristics and the DRX characteristics. Additionally, or in the alternative, the mismatch indication signal may be indicative of an amount of the mismatch between the DTX characteristics and the DRX characteristics. Such a mismatch amount may be specified in the mismatch indication signal in the form of a period of time corresponding to the temporal mismatch. Still further, the mismatch indication signal may additionally, or in the alternative, be indicative of an incremental adjustment of at least one of the DTX characteristics and the DRX characteristics. Such an incremental adjustment may, for example, be specified in the form of multiples of a predefined step size (such as frames or subframes).

The step of controlling the transceiver device may comprise transmitting at least one timing control signal to the transceiver device. The timing control signal may take various forms depending on the specific communication standard utilized for the communication between the network device and the transceiver device. In one implementation, the one or more timing control signals comprise at least one of an uplink scheduling grant and a downlink scheduling indication.

The method may further comprise the step of receiving a capability information signal from the transceiver device. The capability information signal may indicate that the transceiver device is capable of adjusting at least of its DTX characteristics and its DRX characteristics. The network device may therefore only perform a DTX/DRX characteristics synchronization in relation to transceiver devices actually supporting this feature. Additionally, or in the alternative, the capability information signal may indicate one or more power management capabilities of the transceiver device. The power management capabilities may individually specify one or more power saving measures or parameters supported by the transceiver device.

The transceiver device may, for example, be a battery-operated device and the battery may be almost empty so that the transceiver device would benefit from power saving measures. The method may thus further comprise determining, by the network device, that the transceiver device is in need of a reduced power consumption. The step of determining that the transceiver device is in need of a reduced power consumption may be based on receiving a corresponding indication from the transceiver device. Possible examples of such an indication include one or more of a power control request signal, a power consumption measurement report, an idleness status report, and a power status report.

In response to determining that the transceiver device is in need of a reduced power consumption, one or more steps may be implemented or triggered by the network device as power saving measures in relation to the transceiver device. For example, the network device may initiate controlling the transceiver device to adjust at least one of its DTX characteristics and its DRX characteristics so as to align the DTX pauses and the DRX pauses (e.g., to potentially increase the opportunity for power saving micro-sleep periods on the side of the transceiver device). Additionally, or in the alternative, the network device may adjust at least one of a transmission channel bandwidth, a bit rate, a transmission mode (such as a switching between a duplex and a simplex transmission mode), and a voice activation mode in accordance with a power consumption reduction scheme.

The transceiver device benefits most from the alignment of DTX pauses and DRX pauses in the case of low bit rate services (e.g., as generally described in RFC-2689). In the case of low bit rate services such as voice services, infrequent transmission and reception periods will typically suffice from the perspective of the transceiver device. The method may thus selectively be performed for such services.

According to a further aspect, a method of controlling a transceiver device of a wireless communication network is provided. The method is performed by the transceiver device and comprises the steps of determining a temporal mismatch between DTX characteristics and DRX characteristics of the transceiver device and adjusting at least one of the DTX characteristics and the DRX characteristics such that DTX pauses become essentially aligned with DRX pauses.

In one implementation, the DTX characteristics define reference characteristics, and the DRX characteristics are adjusted relative to the DTX characteristics. In another implementation, the DRX characteristics may be selected to define the reference characteristics.

The method may further comprise the step of temporarily reducing a power consumption of the transceiver device. The power consumption may in particular be reduced during the periods of time in which the DTX pauses and the DRX pauses coincide. Outside the coinciding DTX and DRX pauses, the power consumption may be increased again.

A possible measure for reducing the power consumption is voltage down-scaling of one or more components of the transceiver device. Alternatively, or in addition, performance of one or more components of the transceiver device may be reduced. Such components comprise a power amplifier, a low-noise amplifier, a radio front-end, a clocking mechanism, a radio signal processing integrated circuit, and a discrete power domain of an integrated circuit.

As a further measure to reduce the power consumption, the transceiver device may adjust at least one of a transmission channel bandwidth, a bit rate, a transmission mode (such as a duplex or a simplex transmission mode), and a voice activation mode. Such an adjustment may be performed in accordance with a power consumption reduction scheme and may be triggered or initiated by the network device. In one variant, the adjustment is initiated or triggered by the network device in response to receipt of a mismatch indication signal from the transceiver device.

The method may thus also comprise transmitting a mismatch indication signal towards a network device. The mismatch indication signal may take the form of a report or request signal that comprises a signal portion indicative of the temporal mismatch. As an example, the mismatch indication signal may be indicative of at least one of a direction of a mismatch between the DTX characteristics and the DRX characteristics, an amount of a mismatch between the DTX characteristics and the DRX characteristics, and an incremental adjustment of at least one of the DTX characteristics and the DRX characteristics.

According to one implementation, a timing control signal is received by the transceiver device from the network device. As mentioned above, such a timing control signal may comprise at least one of an uplink scheduling grant and a downlink scheduling indication. Once the timing control signal has been received, at least one of the DTX characteristics and the DRX characteristics may be adjusted by the transceiver device in accordance with the timing control signal.

Still further, the method may comprise transmitting a capability information signal from the transceiver device to the network device. The capability information signal indicates to the network device whether or not the transceiver device is capable of adjusting at least one of its DTX characteristics and its DRX characteristics. Additionally, or in the alternative, the capability information signal may indicate power management capabilities of the transceiver device.

The transceiver device may be configured to determine at least one of a power consumption, an idleness status and a power status of the transceiver device or one or more components thereof. For example, one or more of these parameters may be determined (e.g., measures or calculated) for each one of multiple processor cores of the transceiver device. In a next step, a corresponding request or report signal may be transmitted to the network device (e.g., a power control request signal, a power consumption measurement report, an idleness status report and/or a power status report).

According to a still further aspect, a computer program product comprising program code portions for performing the steps of any of the method aspects disclosed herein when the computer program product is executed on a computing device is provided. The computer program product may be stored on a computer-readable recording medium. The computer-readable recording medium may be a permanent or rewritable memory such as a Flash or EEPROM, CD-ROM, DVD or Memory Stick.

Also provided is a network device configured to control a transceiver device of a wireless communication network. The network device comprises a determinator configured to determine a temporal mismatch between DTX characteristics and DRX characteristics of the transmitter device and a controller configured to control the transceiver device to adjust at least one of its DTX characteristics and its DRX characteristics such that DTX pauses become essentially aligned with DRX pauses.

The network device may belong to an access network portion or to a core network portion of the telecommunication network. Moreover, the network device may also be realized as a distributed component located partially in the access network and partially in the core network.

The network device may be configured in accordance with Release 8 or higher of the 3GPP specifications. These 3GPP specifications do presently not yet explicitly define any DTX scheme for LTE. As understood herein, a DTX idle period in the framework of the present 3GPP specifications is therefore a pause in which the user device is not transmitting towards the network.

Another aspect of the present disclosure relates to a transceiver device of a wireless communication network. The transceiver device comprises a determinator configured to determine a temporal mismatch between DTX characteristics and DRX characteristics of the transceiver device and an adjustor configured to adjust at least one of the DTX characteristics and the DRX characteristics such that DTX pauses become essentially aligned with DRX pauses.

The transceiver device may further comprise a power management unit configured to reduce a power consumption of a transceiver device. The power consumption of the transceiver device may in particular temporarily be reduced during the aligned DTX and DRX pauses to make use of the synchronized idle periods resulting therefrom.

The transceiver device may be configured as a mobile user device such as a mobile telephone, a network access (or data) card, and so on. Like the network device, the transceiver device may also be compliant with Release 8 or higher of the 3GPP specifications.

BRIEF DESCRIPTION OF THE DRAWINGS

In the following, the present disclosure will be described in more detail with reference to exemplary embodiments illustrated in the drawings, wherein.

DETAILED DESCRIPTION

Those skilled in the art will appreciate that the steps, functions and processes explained herein may be implemented using individual hardware circuitry, using software functioning in conjunction with a programmed microprocessor, Field-Programmable Gate Array (FPGA), Application Specific Integrated Circuit (ASIC), one or more Digital Processors (DSPs) or general purpose computer. It will also be appreciated that when the current disclosure is described with reference to methods and method steps, it may also be embodied in a computer processor and a memory coupled to the processor, wherein the memory is encoded with one or more programs that perform the methods and method steps disclosed herein when executed by the processor.

In the following description, for purposes of explanation and not limitation, specific details are set forth with regard to the alignment of DTX pauses and DRX pauses in a wireless communication network. These details are set forth in order to provide a thorough understanding of the technique disclosed herein. It will be apparent to one skilled in the art that this technique may be practised in other embodiments that depart from the specific details. For example, the skilled artisan will appreciate that while the following embodiments will mainly be described with reference to LTE communication networks compliant with Release 8 or higher of the 3GPP specifications, the present disclosure may also be practised in combination with earlier releases or in combination with other specifications pertaining to wireless communication networks.

In the 3GPP specifications, DRX mechanisms suitable for implementing the present disclosure have already been specified (see, e.g., Sections 3.1 and 5.7 of 3GPP TS 36.321). DTX mechanisms as understood herein have not yet been specifically defined in the existing 3GPP specifications (Release 8 or higher). Accordingly, in the scope of the following embodiments pertaining to LTE communication networks (and in the absence of any specific definitions in the applicable 3GPP specifications) a DTX pause may be defined as an idle period in which the transceiver device is not transmitting in the uplink direction (e.g., to an access network). In such a scenario the DTX characteristics may, for example, be defined by the uplink scheduling grants transmitted on the PDCCH. DTX "cycles" can thus be specified by sequentially transmitted uplink scheduling grants in a dynamic scheduling scenario. In a SemiPersistence Scheduling (SPS) scenario the SPS period may be interpreted as defining a DTX cycle. A DTX pause may be interrupted by each uplink transmission from the user device (e.g., via Scheduling Requests, SRs). The network may, however, schedule the transmission of uplink scheduling grants to be synchronized with the DRX characteristics.

Figure 2:
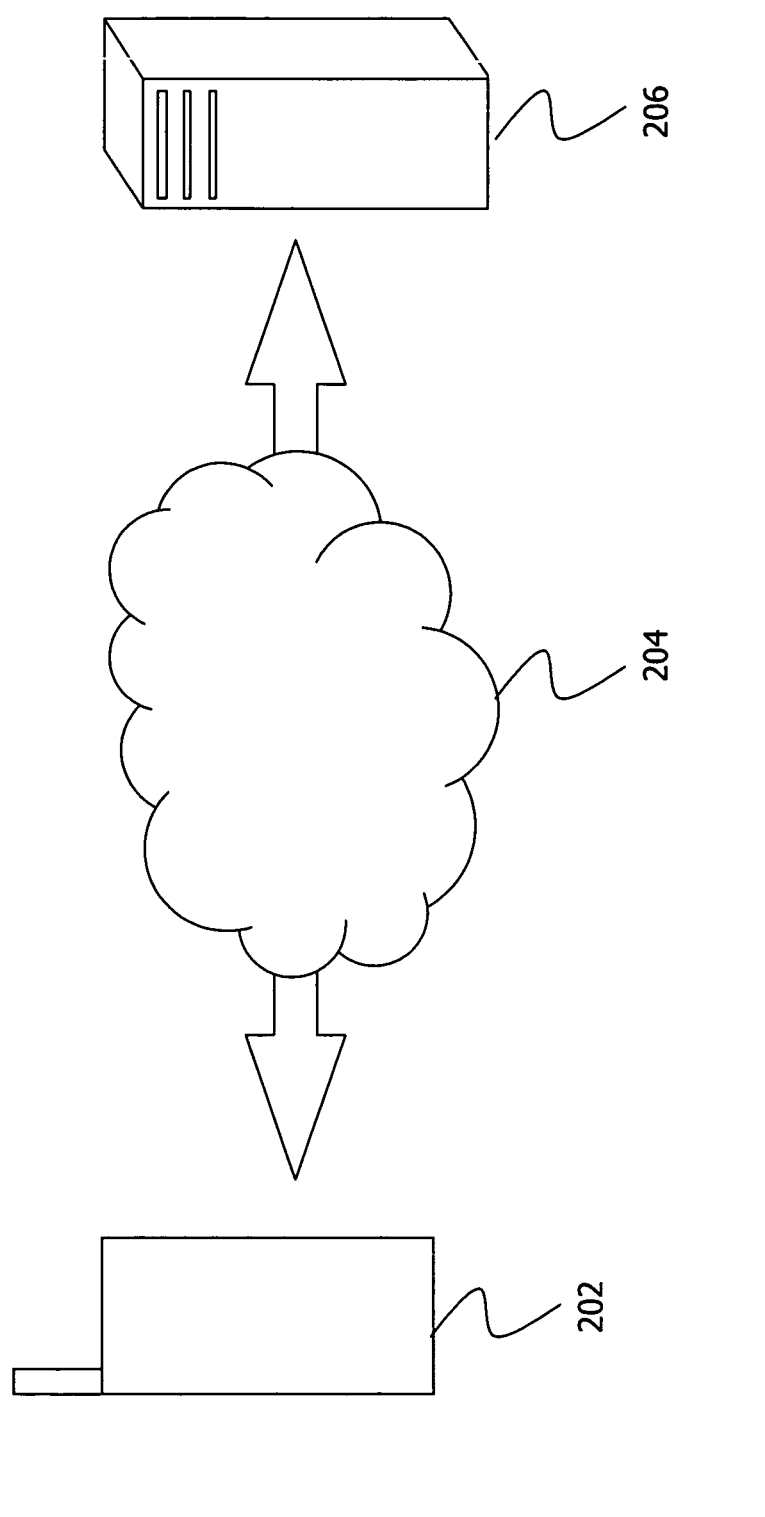
FIG. 2 schematically illustrates the communication between a transceiver device and a network device over a wireless communication network.

FIG. 2 generally illustrates an embodiment of a wireless communication network 200 comprising a transceiver device 202, a wireless network link 204 as well as a network device 206. In the present embodiment the transceiver device 202 is configured as a mobile telephone, but in other embodiments the transceiver device may be realized in the form of a network access card installed or installable in a portable or stationary computer. The network device 206 may be realized by a server located in a core network portion of the communication network 200. In an alternative embodiment, the network device 206 may at least partially be located in an access network portion.

Figure 3:
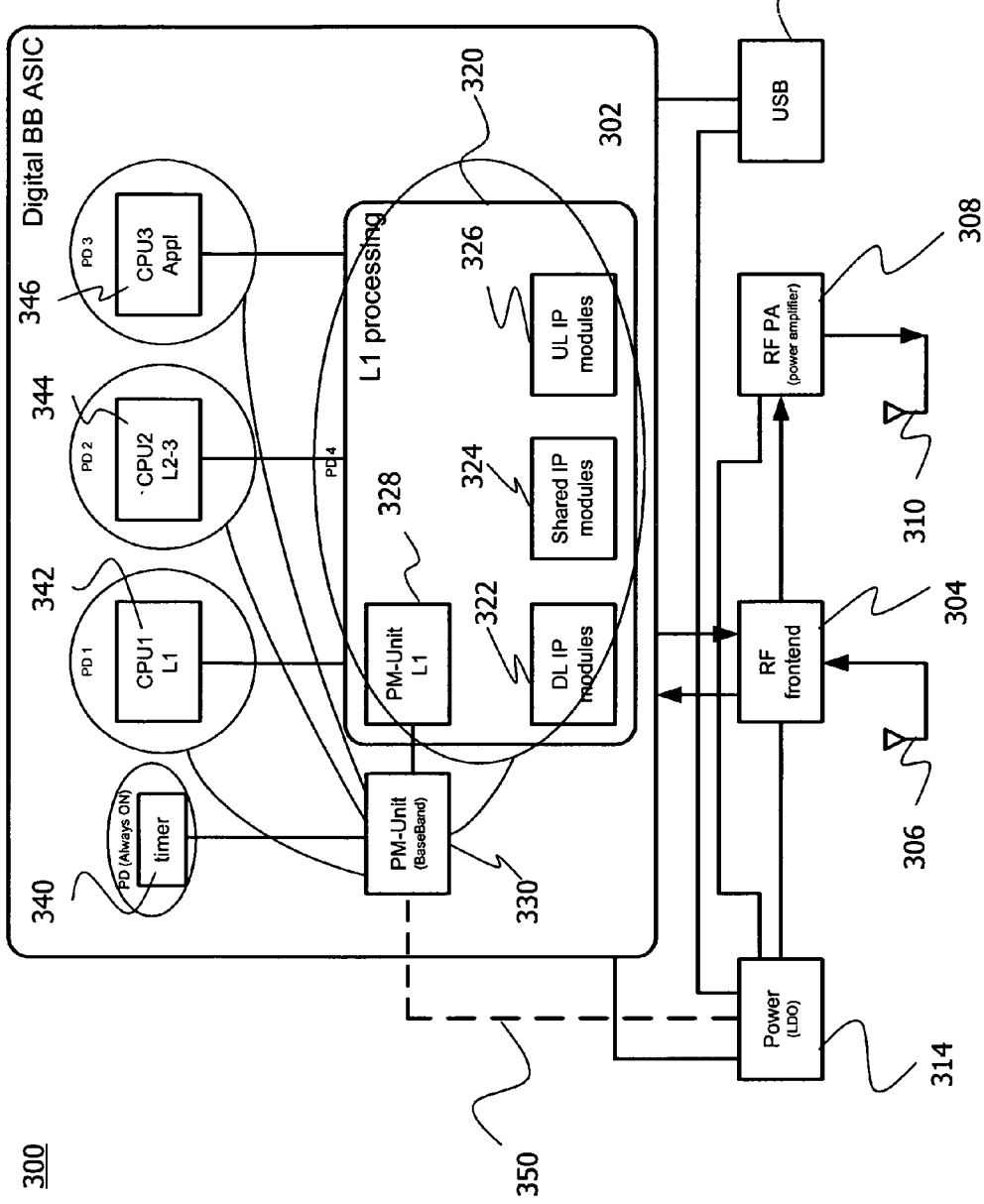
FIG. 3 is a schematic block diagram illustrating the configuration of an embodiment of a transceiver device.

FIG. 3 illustrates an embodiment of the internal configuration of a hardware platform 300 integrated in the transceiver device 202 of FIG. 2 (or in any other transceiver device different from the transceiver device 202 illustrated in FIG. 2). As becomes apparent from FIG. 3, the hardware platform 300 comprises a digital Baseband (BB) ASIC 302, a Radio Frequency (RF) front-end 304 coupled to a receive antenna 306 on the one hand and the BB ASIC 302 on the other, an RF Power Amplifier (PA) 308 coupled between a transmit antenna 310 and the RF front-end 304, as well as a Universal Serial Bus (USB) transceiver 312 coupled to the BB ASIC 302.

The hardware platform 300 further comprises a Low Drop-Out (LDO) power regulator 314. The power regulator 314 is a component which is in charge of providing the appropriate supply voltage to the BB ASIC 302, the RF front-end 304, the RF PA 308 and the USB transceiver 312. In the present embodiment, the power regulator 314 is capable of voltage scaling responsive to a control signal received from a power management unit as will be described in more detail below.

The BB ASIC 302 comprises a Layer 1 (L1) processing sub-system 310 with three Intellectual Property (IP) modules 322, 324 and 326. IP module 322 is in charge of L1 processing in the downlink direction, IP module 326 performs L1 processing in the uplink direction, and IP module 324 is a shared module that performs L1 processing tasks in both the downlink and the uplink direction.

The sub-system 320 further comprises a L1 Power Management (PM) unit 328 in charge of power distribution and management functionalities. The PM unit 328 is in communication with a central PM unit 330 of the BB ASIC 302. The central PM unit 330 controls, among others, the L1 PM unit 328 of the L1 processing sub-system 320 and is connected to a timer 340 which provides a timing signal for control purposes. In particular, the timer 340 is used to control waking-up individual components of the hardware platform 300 by the PM unit 330 in accordance with the prevailing DRX and DTX characteristics (e.g., after each DTX and DRX pause).

As illustrated in FIG. 3, the BB ASIC 302 further comprises three dedicated processor cores 342, 344, 346 all coupled to the L1 processing sub-system 320 and controllable via the PM units 328, 330. The first processor core 342 (CPU1) provides L1 processing functionalities. The second processor core 344 (CPU2) provides processing capabilities in relation to Layer 2 (L2) and Layer 3 (L3) processing tasks. The remaining third processor core 346 (CPU3) is configured to execute dedicated applications residing on the transceiver device 202 (such as telephone book applications) and is further configured to control the exchange of data and control information between the hardware platform 300 and any other hardware platform co-located with the hardware platform 300 inside the transceiver device 202 or located on an external device (e.g., on a mobile computer). This exchange of data and control information may be performed via the USB transceiver 312.

In the embodiment illustrated in FIG. 3 the BB ASIC 302 comprises four discrete Power Domains (PD) individually controllable by the central PM unit 330 (with the optional assistance of the L1 PM unit 328). A first power domain (PD 1) is defined by processor core 342, a second power domain (PD 2) by processor core 344 and a third power domain (PD 3) by processor core 346. A fourth power domain (PD 4) is defined by the L1 processing sub-system 320. The various PDs can individually be controlled (e.g., switched on and off) in accordance with a power consumption reduction scheme enforced by the central PM unit 330.

As one further possible power saving measure, the supply voltages of the BB ASIC 302, the RF front-end 304, the RF PA 308 and the USB transceiver 312 may be down-scaled. To this end, the central PM unit 330 comprises a control connection 350 to the power regulator 314. Although not shown in FIG. 3, the transceiver device 202 further comprises a clocking component that may also be coupled via a control connection to the central PM unit 330.

The above and further power saving measures may in particular be implemented in connection with the alignment of DTX pauses and DRX pauses as will now be described in more detail.

Figure 4:
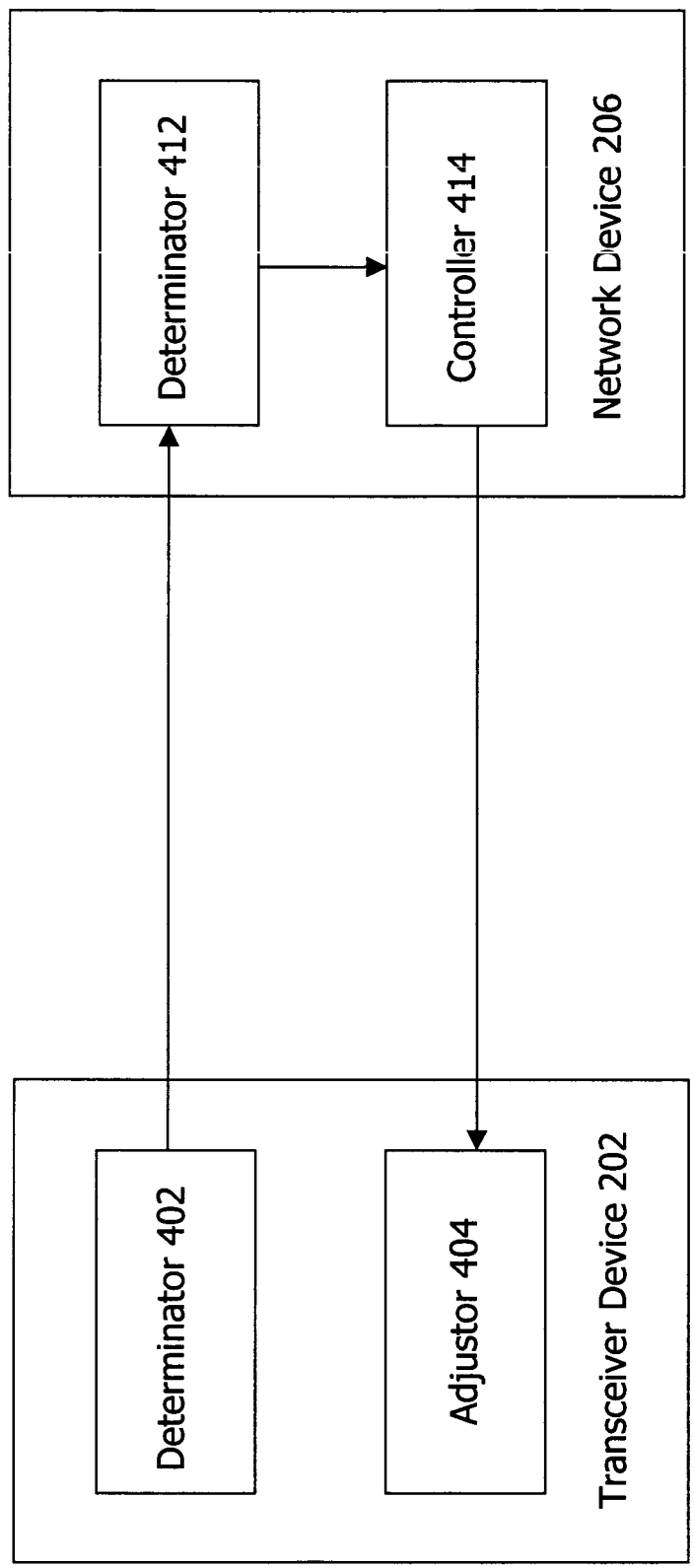
FIG. 4 illustrates exemplary embodiments of a transceiver device and a network device.

FIG. 4 illustrates the internal configuration of the transceiver device 202 and of the network device 206 as far as the alignment of DTX and DRX pauses is concerned. On the side of the transceiver device 202, the hardware functionalities illustrated in FIG. 4 could be implemented by the BB ASIC 302 shown in FIG. 3 and involve, for example, one or more of the processor cores 342, 344, 346 and one or more of the PM units 328, 330.

As shown in FIG. 4, the transceiver device 202 comprises the functional components of a determinator 402 and an adjustor 404. The determinator 402 is configured to determine a temporal mismatch between DTX characteristics and DRX characteristics of the transceiver device 202. Based on the temporal mismatch thus determined, the adjustor 404 allows an adjustment of at least one of the DTX characteristics and the DRX characteristics of the transceiver device 102 such that DTX pauses become essentially aligned with DRX pauses.

The network device 206 comprises a determinator 412 configured to determine a temporal mismatch between the DTX characteristics and the DRX characteristics of the transceiver device 202. To this end, the determinator 412 may evaluate information about the temporal mismatch previously determined by the determinator 412 of the transceiver device 202. This information may be received, for example, via a dedicated mismatch indication signal transmitted from the transceiver device 202 to the network device 206 as indicated by the upper arrow in FIG. 4.

The network device 206 further comprises a controller 414 configured to control the transceiver device 202 to adjust at least one of its DTX characteristics and its DRX characteristics such that the DTX pauses become essentially aligned with the DRX pauses. As one example, the controller 414 may generate a timing control signal aiming at an alignment of the DTX pauses and the DRX pauses. The timing control signal may in the next step be transmitted from the network device 206 to the transceiver device 202 as indicated by the lower arrow in FIG. 4. The adjustor 404 of the transceiver device 202 may then in a next step align the DTX pauses with the DRX pauses under control of the timing control signal.

In the following, the signalling between the transceiver device 202 and the network device 206 in the context of aligning the DRX pauses and the DRX pauses will be described in a more detailed manner with respect to the exemplary signalling diagram 500 of FIG. 5. The signalling diagram 500 refers to a scenario in which the transceiver device 202 and the network device 206 are deployed in a telecommunication network compliant with Release 8 of the 3GPP specifications. In accordance with these specifications, the transceiver device 202 will also be referred to as User Equipment (UE).

Figure 5:
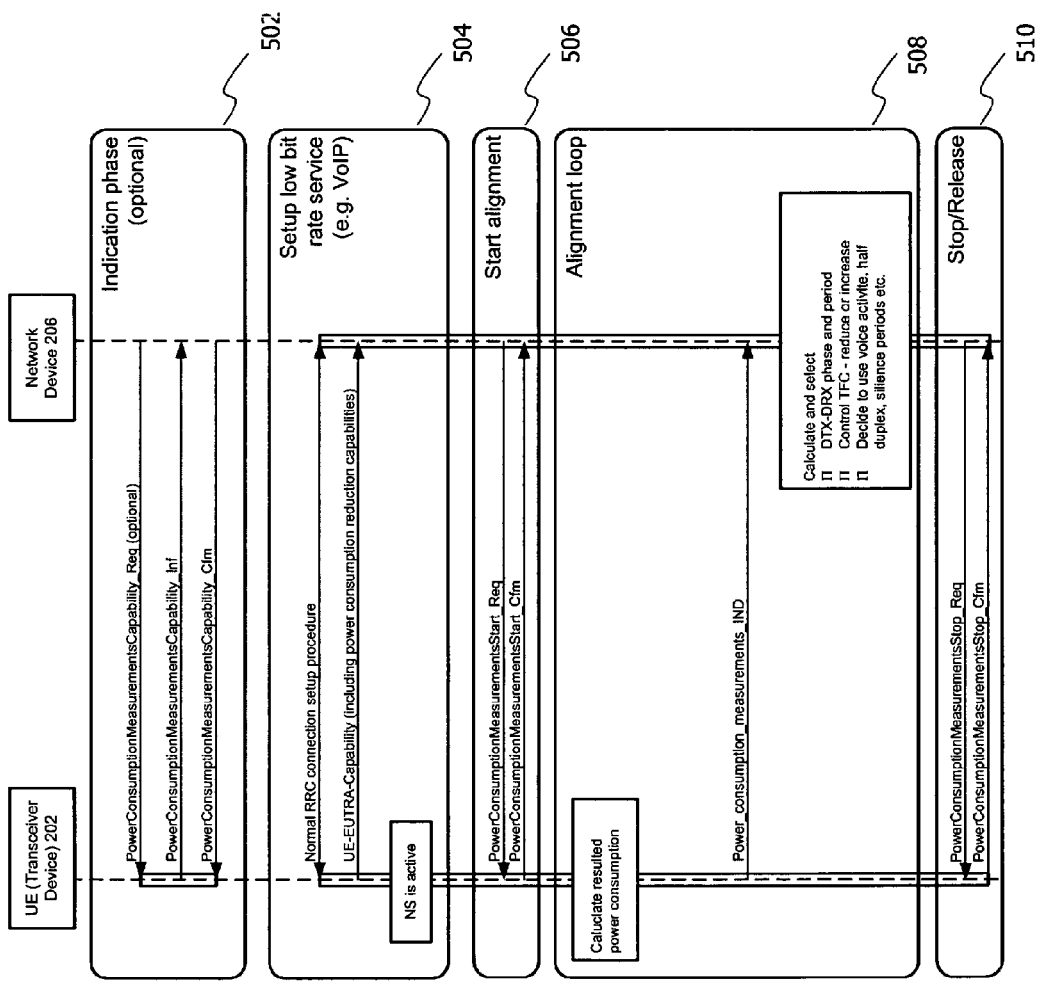
FIG. 5 schematically illustrates the signalling between a transceiver device and a network device according to a method embodiment.

As illustrated in FIG. 5, the whole alignment procedure involves five separate phases. Specifically, the alignment procedure starts with an indication phase 502 in which the transceiver device 202 informs the network device 206 of its capabilities regarding the adjustment of its DTX and/or DRX characteristics and its power management capabilities. In a second phase 504 a service is set up. In the present embodiment, this service is a low bit rate service such as a Voice-over-Internet Protocol (VoIP) service. As will be appreciated from the following discussion, low bit rate services derive particular benefits from the alignment procedure when it comes to the initiation of power saving measures.

After the indication phase 502 and the service setup phase 504 have been completed, the actual alignment mechanisms are started in a next phase 506. Once the alignment mechanisms have been started, an alignment loop is carried out in a phase 508 to continuously align the DTX pauses and DRX pauses in accordance with the (potentially changing) processing load and/or available power resources of the transceiver device 202. In a final phase 510, the alignment procedure is stopped.

The individual phases as well as the signals transmitted in the individual phases will be discussed now. The (optional) indication phase 502 starts with the network device 206 checking for the capabilities of the transceiver device 202 in relation to the adjustment of its DTX characteristics and/or DRX characteristics and in relation to its power management (e.g., power consumption reduction) capabilities. This process may involve or may be performed in accordance with the so-called status inspection feature as specified in 3GPP TS 32.401. To this end, the network device 206 in a first step sends a power management capability request signal (PowerConsumptionMeasurementsCapability_Req) to the transceiver device 202 as shown in FIG. 5. In response to receipt of this signal, the transceiver device 202 checks its capabilities and responds with a corresponding capability information signal (PowerConsumptionMeasurementsCapability_Inf) to the request signal of the network device 206.

The capability information signal may individually indicate support for each of a plurality of power management capabilities (including support for the alignment of the DTX pauses and DRX pauses). The power management capabilities may be indicated via an Information Element (IE) transmitted in the capability information signal. The following table illustrates the structure of an exemplary IE denoted vElementsEnable.

Various power management capabilities may be signalled using the following parameters of the above IE:

tPeriod: The transceiver device 202 is capable of specifying a measurement period for power-related measurements;

vIdlePhase: the transceiver device 202 is capable of reporting the idleness status of its Network Signalling (NS) part;

vPowerSupply: the transceiver device 202 is capable of reporting the status of its power supply (e.g., a battery status);

vShiftMultiplier: the transceiver device 202 is capable of reporting a mismatch amount between its DTX characteristics and its DRX characteristics (e.g., by indicating a required phase shift between its DRX cycles and its DTX cycles so as to align the DTX pauses with the DRX pauses; the phase mismatch amount may be indicated in the form of an incremental adjustment specified in the form of a number of frames or a number of subframes);

bShiftStep: the transceiver device 202 is capable of reporting a mismatch direction between its DTX cycles and its DRX cycles (i.e.; a direction of the required shift with respect to any of the DRX characteristics and the DTX characteristics being selected as reference characteristics).

The indication phase 502 ends with the network device 206 confirming receipt of the capability information signal from the transceiver device 202. To this end, a corresponding confirmation signal (PowerConsumptionMeasurementsCapabilty_Cfm) is sent from the network device 206 to the transceiver device 202 as illustrated in FIG. 5.

Once the indication phase 502 has been completed, the service setup phase 504 is initiated. In the course of the service setup phase 504, NS is activated. In the present embodiment it will be assumed that a low bit rate service such as a VoIP service is set up.

The setup phase 504 involves a conventional Radio Resource Control (RRC) setup procedure between the transceiver device 202 and the network device 206 as illustrated by the double-headed arrow in the box denoted by reference numeral 504. During the RRC connection setup procedure the transceiver device 202 transmits classmark information (an UE-EUTRA-Cabality IE) to the network device 206 as defined in 3GPP TS 36.331 V8.5.0 (pages 165 to 167). In order to inform the network device 206 of the capabilities of the transceiver device 202 with respect to its power management capabilities (e.g., regarding a reduction of its power consumption), the IE may be extended as illustrated in the code listing below:

| Element | Range | Type | Unit | Description/Comments |
|---|---|---|---|---|
| vElementsEnable | 11111 | bits | ENUM | All elements in indication message are supported |
| | 00001 | bits | ENUM | tPeriod: bit[0] = 1 −> available, UE can report the measurement period |
| | 00010 | bits | ENUM | vIdlePhase: bit[1] = 1 −> available |
| | 00100 | bits | ENUM | vPowSupply: bit[2] = 1 −> available |
| | 01000 | bits | ENUM | vShiftMultiplier: bit[3] = 1 −> available |
| | 10000 | bits | ENUM | bShiftStep: bit[4] = 1 −> available |

```
UE-EUTRA-Capability ::=         SEQUENCE {
    accessStratumRelease            AccessStratumRelease,
    ue-Category                     INTEGER (1..5),
    pdcp-Parameters                 PDCP-Parameters,
    phyLayerParameters              PhyLayerParameters,
    rf-Parameters                   RF-Parameters,
    measParameters                  MeasParameters,
    featureGroupIndicators          BIT STRING (SIZE (32))              OPTIONAL,
    interRAT-Parameters             SEQUENCE {
        utraFDD                         IRAT-ParametersUTRA-FDD         OPTIONAL,
        utraTDD128                      IRAT-ParametersUTRA-TDD128      OPTIONAL,
        utraTDD384                      IRAT-ParametersUTRA-TDD384      OPTIONAL,
        utraTDD768                      IRAT-ParametersUTRA-TDD768      OPTIONAL,
        geran                           IRAT-ParametersGERAN            OPTIONAL,
        cdma2000-HRPD                   IRAT-ParametersCDMA2000-HRPD    OPTIONAL,
        cdma2000-1xRTT                  IRAT-ParametersCDMA2000-1XRTT   OPTIONAL
    },
    nonCriticalExtension            SEQUENCE {
                                        PowerManagmentParameter         OPTIONAL
    }                                                                   OPTIONAL
}
⋮
PowerManagmentParameter ::=     SEQUENCE {
    Ue-PowerReductionSupported      BOOLEAN
}
-- ASN1STOP
```

In the above code listing, the extensions have been underlined. The extensions may comprise a boolean bit indicating whether or not the transceiver device 202 supports power management. Since the IE is exchanged during the RRC connection setup procedure, the communication overhead may thus be decreased. It should be noted that the extended IE could be used in addition or as an alternative to the above IE vElementsEnable. The extended IE may in particular be required in case the optional indication phase 502 is omitted.

Figure 6:
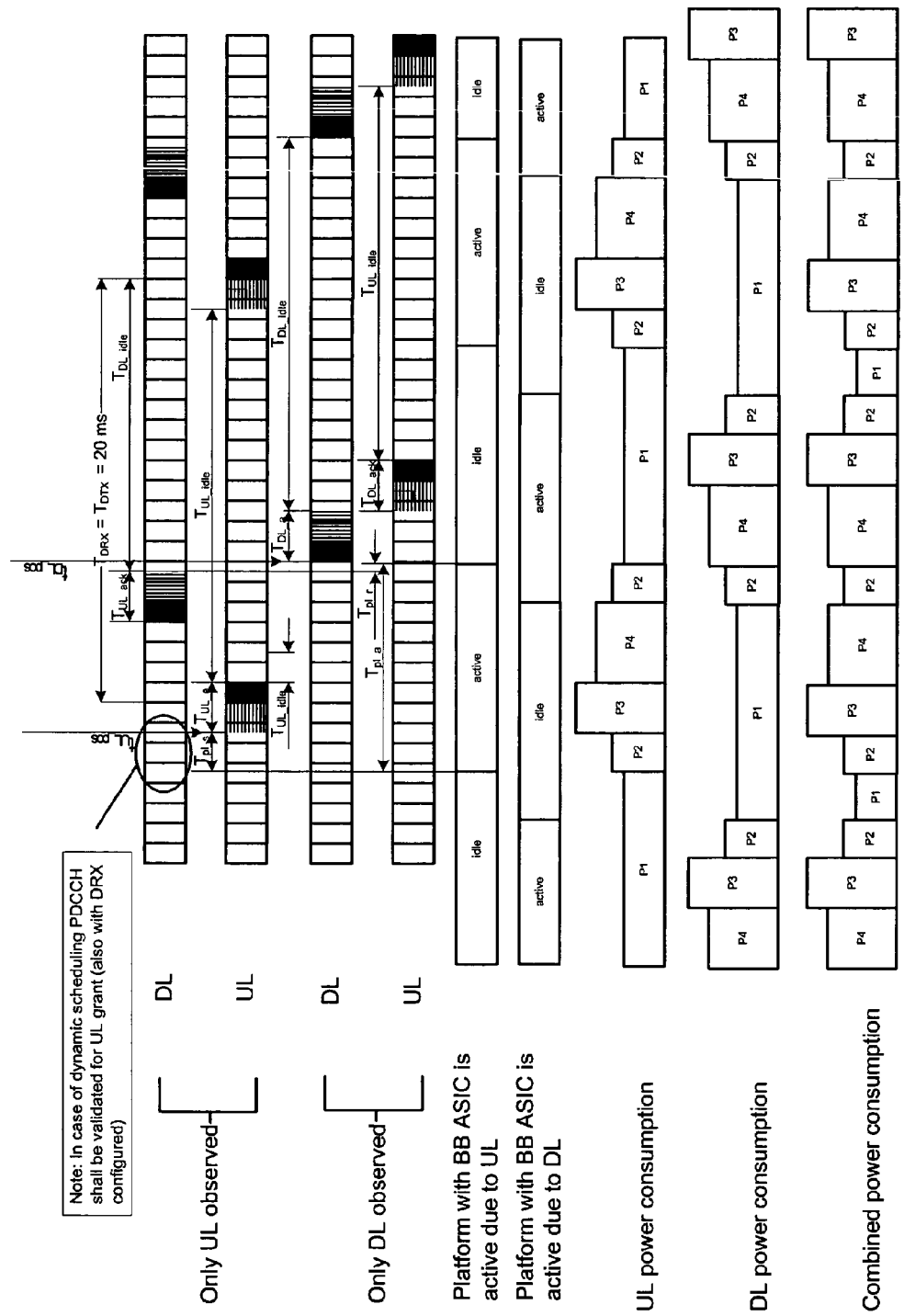
FIG. 6 is a schematic diagram illustrating mis-aligned DTX pauses and DRX pauses in exemplary uplink and downlink processing scenarios.

Once the low bit rate service has been set up in the setup phase 504, data (e.g., VoIP data) is exchanged between the transceiver device 202 and the network device 206. FIG. 6 illustrates the data processing activities of the hardware platform 300 of FIG. 3 including the BB ASIC 302 in the context of this data exchange.

It should be noted that the data processing scenario illustrated in FIG. 6 is simplified as re-transmissions and dynamic scheduling are not considered. Generally spoken, FIG. 6 indicates a locked best case SPS configuration without re-transmissions. In the case of dynamic scheduling, the ellipse marking in FIG. 6 shows the block which corresponds to the DRX position where the transceiver device 202 shall monitor the PDCCH.

In FIG. 6, the upper two rows show the downlink (DL) and uplink (UL) processing activities, respectively, of the hardware platform 300 when only the UL is observed in relation to the air interface absolute timing assigned for the cell hosting the transceiver device 202 (e.g., by System Frame Number, SFN). The lower two rows illustrate the corresponding processing activities of the hardware platform when only the DL is observed.

In the individual rows, one individual processing block corresponds to a subframe (having a duration $T_{SF}=1$ ms) or one Transmission Time Interval (TTI). An empty block indicates in FIG. 6 that no transmission over the wireless network link (reference numeral 204 in FIG. 2) takes place. A full block in the first row and the third row indicates a DL data or DL acknowledgment transmission, whereas a full block in the second row and the fourth row indicates an UL data or UL acknowledgment transmission. A hatched block in the first row and the third row is indicative of the time required for DL post-processing and a hatched block in the second row and a fourth row of an UL pre-processing.

The lower portion of FIG. 6 illustrates the processing activities of the hardware platform 300 for the UL and DL as well as the resulting UL power consumption, DL power consumption and combined UL and DL power consumption.

The average total power consumption of the hardware platform 300 can be generally calculated as follows:

$$\text{Power} = \eta \times \sum_{C}^{M} (P_C)$$

$$\text{Power} = \eta \times (P_{DB7000} + P_{RF7000} + P_{PA+LNA} + P_{USB})$$

Where $\eta$: 1/LDO efficiency $P_C$: power consumed by component "C" of hardware platform 300

$P_{DB7000}$: average power consumption of the BB ASIC 302 [W]

$P_{RF7000}$: average power consumption of the RF front-end 304 [W]

$P_{PA+LNA}$: average power consumption of the RF PA 308 and its Low Noise Amplifier (LNA, not shown in FIG. 3) [W]

$P_{USB}$: average power consumption of the USB transceiver 302 [W]

C: first components specified by name

M: last component

In FIG. 6, the individual power consumption levels P1, P2, P3 and P4 in relation to the components illustrated in FIG. 3 can be defined as follows:

P1 (leakage + "always on" elements)
P2 (leakage + all on + sub-system 320 off)
P3 (leakage + all on)
P4 (leakage + all on + PA 308 off)

Without an optimization, the power consumption of the hardware platform 300 could in the worst case be equal to the data rate for high bit rate services which operate roughly at 2 W. This high power consumption is a result of the fact that the idle periods in relation to the UL and the DL are not synchronized in the exemplary scenario of FIG. 6, which prevents the implementation of power saving measures. In other words, the DTX and DRX pauses are temporally mis-aligned. To quantitatively assess the mis-alignment of the DTX and DRX pauses idle periods and the alignment potential resulting therefrom, the following parameters illustrated in the upper portion of FIG. 6 need to be analysed.

Figure 1:
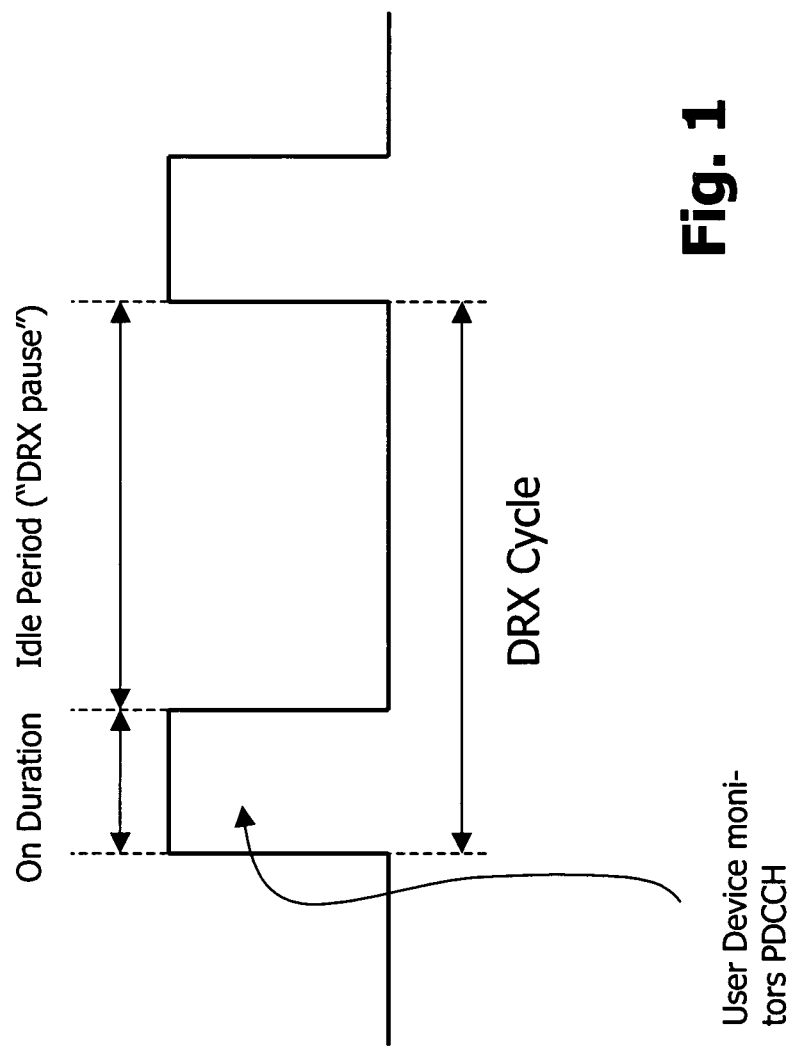
FIG. 1 schematically illustrates a DRX cycle as defined in 3GPP TS 36.211.

$t_{UL\_pos}$:

The subframe start point ($t_{UL\_pos}$) of an UL data transmission is configured by UL scheduling grants received on the PDCCH. In the case of dynamic scheduling with DRX configured (see 3GPP TS 36.321, Discontinuous Reception, DRX, chapter 5.7), the transceiver device 202 will monitor in each DRX activity period ("On Duration", see FIG. 1) the PDCCH for UL scheduling grants. The transceiver device 202 shall send 4 subframes later data to an evolved NodeB (eNodeB) of an access network (the eNodeB may, for example be co-located with or constitute the network device 206).

The DRX characteristics are generally specified using the following parameters:

on DurationTimer
drx-InactivityTimer
drx-Retransmission Timer
longDRX-Cycle
shortDRX-Cycle→Not used
drxShortCyde Timer→Not used
HARQ RTT Timer The parameter on DurationTimer (monitored by the timer 340 of the hardware platform 300 of FIG. 3) indicates when to wake up the BB ASIC 302 by the PM unit 330 to access the PDCCH. The parameter drx-InactivityTimer indicates the active period inside the DRX cycle. LongDR-Cycle indicates the length of a DRX cycle.

In the case of SPS the position ($t_{UL\_pos}$) is specified by a RRC message which activates SPS for the DL. The period of the SPS in frames and periodicity is also specified in a RRC message (see 3GPP TS 36.331, SPS-Config, page 177).

$T_{UL\_a}$:

This period is the processing time for an UL package and for internal pre-processing in the TX chain. The period may be equal to the DRX cycle (see 3GPP TS 36.321 for dynamic scheduling and with the SPS parameter as specified in 3GPP TS 36.331).

$t_{DL\_pos}$:

This period is specified in PDCCH by DCI format 0, which specifies the resource allocation of the UE for dynamic scheduling (see 3GPP TS 36.211, Resource Mapping, and 3GPP TS 36.213). If SPS is configured, the start point $t_{DL\_pos}$ is specified with an RRC message, and the periodicity (cycle length) is given by the SPS parameters (see 3GPP TS 36.331).

$T_{DL\_a}$:

This is the period corresponding to the time required to receive a DL package and internal post-processing in RX chain. This period is equal to the period between two DCI format 0 received for the DL processing in dynamic scheduling and the SPS period configured for DL in semi-persist scheduling.

$T_{pl\_s}$:

Period that hardware platform 300 needs to prepare for signal processing $T_{pl\_r}$:

Period that hardware platform 300 needs to go into the idle state after signal processing $T_{pl\_a}$:

Period that hardware platform 300 needs to handle the UL or DL signal processing $T_{pl\_idle}$:

Period that the hardware platform 300 is in idle state for the UL (UL idle period). This period can be calculated as:

$$T_{pl\_idle}(UL) = \frac{T_{DTX} - T_{pl\_a}}{T_{DTX}}$$
$$= \frac{T_{pl\_s} + T_{UL\_a} + 4 * T_{SF} + T_{UL\_ack} + T_{pl\_r}}{T_{DTX}}$$

The period that the hardware platform 300 is in idle state for DL (DL idle period) can be calculated as:

$$T_{pl\_idle}(DL) = \frac{T_{DRX} - T_{pl\_a}}{T_{DRX}}$$
$$= \frac{T_{pl\_s} + T_{DL\_a} + 4 * T_{SF} + T_{DL\_ack} + T_{pl\_r}}{T_{DRX}}$$

The period that the platform is in the idle state in total is the time where the DL and UL are concurrently idle:

$$T_{pl\_idle}(\text{total}) = T_{p\_idle}(UL) \cap T_{p\_idle}(DL)$$

This value shall be maximized. The optimization will effect that the $t_{DL\_pos}$ position is moved to be aligned with reference time point $t_{UL\_pos}$ (as the UL is time advanced against DL), with the aim of maximizing $t_{pl\_idle}$. This alignment can make use of a PLL algorithm in combination with control activities of the network device 206 (e.g., of the eNB/EUTRAN).

In order to align the mis-aligned UL and DL idle periods in the scenario of FIG. 6 (i.e., the $t_{DL\_pos}$ and $t_{UL\_pos}$ positions and thus the DTX and DRX pauses), the alignment procedure is initiated in the start alignment phase 506 illustrated in FIG. 5. To this end the network device 206 transmits an alignment start request signal (PowerConsumptionMeasurementsStart_Req) to the transceiver device 202. This request signal comprises two IEs, namely tPeriod and vElementEnable, having the following contents:

| Element | Range | Type | Unit | Description/Comments |
|---|---|---|---|---|
| tPeriod | 0 | INT | 100 ms | 0: UE select the reporting period |
|  | 1 ... 255 | INT | 100 ms | tPeriod * 100 ms: report period [ms] |
| vElementsEnable | 00000 | bits | ENUM | All elements in indication message are OFF |
|  | 00001 | bits | ENUM | tPeriod: bit[0] = 1 −> ON, UE report the measurement period |
|  | 00010 | bits | ENUM | vIdlePhase: bit[1] = 1 −> ON |
|  | 00100 | bits | ENUM | vPowSupply: bit[2] = 1 −> ON |

| Element | Range | Type | Unit | Description/Comments |
|---|---|---|---|---|
| | 01000 | bits | ENUM | vShiftMultiplier: bit[3] = 1 –> ON |
| | 10000 | bits | ENUM | bShiftStep: bit[4] = 1 –> ON |

The information element tPeriod allows the network device 206 to specify the period of power management measurements carried out by the transceiver device 202. The value "0" of this IE instructs the transceiver device 202 to itself select the corresponding reporting period. With the IE vElementEnable the network device 206 activates the individual functionalities as already discussed above.

In response to receipt of the alignment start request signal from the network device 206, the transceiver device 202 responds with a confirmation signal (PowerConsumption-MeasurementsStart_Cfm). With this confirmation signal, the transceiver device 202 acknowledges the request signal with either a success code "0" or an error code "1 . . . 255".

If the request signal can be successfully confirmed, the transceiver device 202 saves the power management configuration parameters received from the network device 206 and sets up the corresponding functionalities as will now be explained with respect to the alignment loop phase 508 of FIG. 5.

Figure 7:
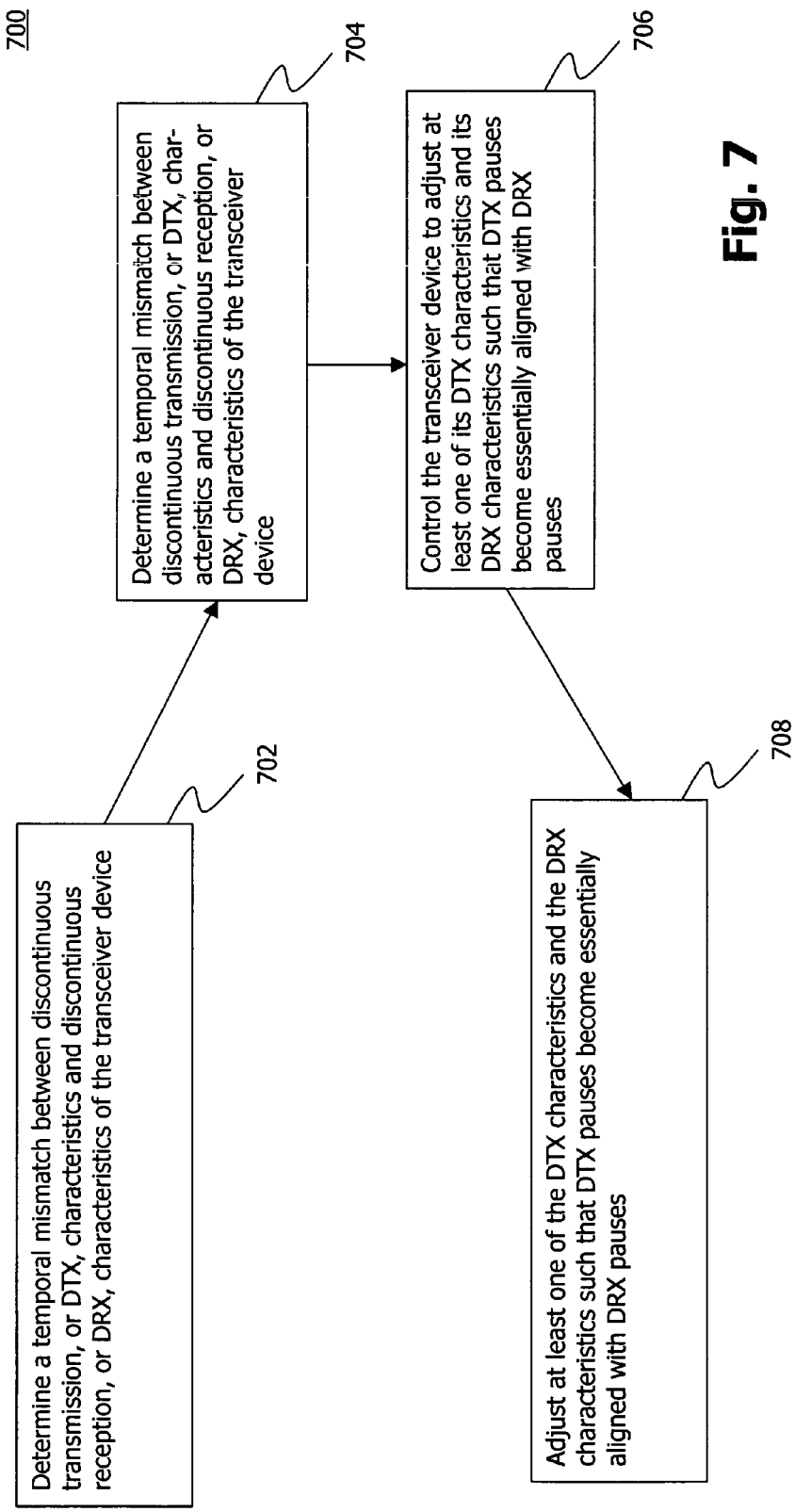
FIG. 7 shows a flow diagram illustrating method embodiments of the operational mode of the transceiver device and the network device for aligning DTX pauses and DRX pauses.

In this alignment loop phase 508, the transceiver device 202 and the network device 206 perform the basic operations illustrated in FIG. 7. In a first step 702, the transceiver device 202 determines the temporal mismatch between the DTX characteristics and the DRX characteristics as illustrated in FIG. 6. The transceiver device 202 further measures the current power consumption and idleness state according to this mismatch. It then informs the network device 206 of the power consumption and idleness state and requests an adjustment of the mismatch, and, optionally initiation of power saving measures.

Specifically, the transceiver device 202 starts measuring the idle periods of the processor cores 342 and 344 of FIG. 3. Additionally, the L1 pre-processing time is measured in the UL IP module 326 and the L1 post-processing time is measured in the DL IP module 322. Based on these measurements, a value for the parameter vIdlePhase in the IE vElementsEnable is calculated. Specifically, the transceiver device 202 calculates for each UL and DL functionality the average of the idle period per measurement block and per measurement period according to the following formulas:

$$IdlePhase_{(k)} = \frac{1}{T_{Meas\_block}} \sum_{i=0}^{T_{Meas\_block}} T_{pl\_idle(i)}$$

$$vIdlePhase = \frac{1}{T_{meas}} \sum_{k=0}^{T_{meas}} IdlePhase_{(k)}$$

Each measurement block may, for example, be defined as an integer multiple of a predefined time period (e.g., of the length of a DRX or DTX period), and each measurement period may be defined as a given number of measurement blocks. As mentioned above, the measurement period may be communicated to the transceiver device 202 via the tPeriod parameter in the IE vElementsEnable.

The handling of the measurement procedure (e.g., relays to its setup or release) as well as the handling of the measurement results can be performed by RRC mechanisms. Specifically, the corresponding handling may be similar than the handling of any conventional RRC measurements.

In addition to calculating a value for the vIdlePhase parameter, the transceiver device 220 further estimates the best position for the DRX characteristics relative to the DTX characteristics. Specifically, the transceiver device 202 calculates values for the parameters sbShiftStep and vShiftMultiplier in the IE vElementsEnable. A value for the parameter sbShiftStep is selected according to the phase direction of the mismatch between $t_{UL\_pos}$ and $t_{DL\_pos}$ as illustrated in FIG. 6. In the present embodiment, the transceiver device 202 uses the DTX characteristics (i.e., the UL DTX phase) as referenced characteristics and determines a shift direction for the DRX characteristics (i.e., the DL DRX phase) relative to the DTX characteristics.

The parameter vShiftMultiplier is calculated as multiples of the duration of a subframe $T_{SF}$ according to $$vShifMultiplier = (-1) \times Floor\left(\frac{t_{UL\_pos} - t_{DL\_pos}}{T_{SF}}\right)$$

The values for the parameters IEvIdlePhase, BShiftStep and vShiftMultplier may be calculated using a filtering algorithm. With the filtering algorithm the transceiver device 202 may generate an individual "shift command" for each subframe and an accumulated and filtered step report for each measurement block (of, e.g., of 100 ms). The result may then be averaged/filtered over the total measurement period (of, e.g., multiples of 100 ms such as 1 sec).

The transceiver device 202 furthermore determines the current status of its power supply (e.g., of its battery). Based on this measurement, the network device 206 may later on decide whether or not to initiate or trigger any power saving measures with respect to the transceiver device 202. It should be noted that such power saving measures may be combined with an alignment control of the DTX pauses and DRX pauses or, in the alternative, may be performed independently from such an alignment. The corresponding power supply measurement provides a value for a parameter vPowSupply.

The various values determined for the parameters Period vIdlePhase, vPowSupply, vShiftMultiplier and bShiftStep are then transmitted in the form of separate IEs from the transceiver device 202 to the network device 206 with a power management report indicator signal (PowerConsumption-Measurments_Ind) as indicated in FIG. 5. This power management report indicator signal thus comprises the following IEs:

| Element | Range | Type | Unit | Description/Comments |
|---|---|---|---|---|
| tPeriod | 0 | INT | 100 ms | 0: empty report |
| | 1 . . . 255 | INT | 100 ms | tPeriod * 100 ms: report period [ms] |

| Element | Range | Type | Unit | Description/Comments |
|---|---|---|---|---|
| vIdlePhase | 255 | INT | | 255: empty element |
| | 0 ... 254 | INT | Number | vIdlePhase/254 * 100: idle phase of NS part of UE in [%] |
| vPowSupply | 0 | INT | | 255: empty element |
| | 0 ... 254 | INT | Number | vPowSupply/254 * 100: Status of the Power supply of the UE. 100% = full, 0% empty |
| vShiftMultiplier | 0 | INT | | |
| | 1 ... 200 | INT | Number | Number of frames to shift the DRX and DTX phase in frames vShiftMultiplier * bShiftStep: number of frame to shift the phase in [10 ms] |
| bShiftStep | 0 | SINT | Number | 00: Hold the phase |
| | 1 | SINT | Number | 01: Shift DRX/DTX in direction of DTX/DRX |
| | −1 | SINT | Number | 11: Shift DRX/DTX in opposite direction to DTX/DRX |
| | −2 | SINT | Number | −2: empty element |

The power management report indicator signal includes a plurality of signal portions including a signal portion relating to a mismatch indication (vShiftMultiplier/bShiftStep), a signal portion pertaining to a power status report (VPowSupply) and a signal portion pertaining to an idleness status report (vIdlePhase). Although not indicated in the table above, a further signal portion pertaining to a power consumption measurement report in relation to the transceiver device 202 may included. In one implementation, the idleness status report will be regarded or interpreted as a power consumption measurement report by the network device 206.

During the alignment loop phase 508 the power management report indicator signal is periodically transmitted from the transceiver device 202 to the network device 206 at the end of each measurement period. The network device 206 then evaluates the corresponding signals received from the transceiver device 202 as indicated by step 704 in FIG. 7. Specifically, the network device 206 will analyze the parameter values for the IEs vShiftMultiplier and bShiftStep to determine whether there exists a temporal mismatch between the DTX characteristics and DRX characteristics of the transceiver device 202. In particular, the network device 206 may schedule its downlink transmissions and/or generate the uplink scheduling grants for the transceiver device 202 taking into account the current values of these IEs such that the temporal mismatch between $t_{DL\_pos}$ and $t_{UL\_pos}$ is successively decreased while the alignment loop is performed (see steps 706 and 708 in FIG. 7).

For example, the network device 206 may use an internal evaluation algorithm to evaluate the reported IE values before initiating any alignment measure. This evaluation algorithm may also consider filtering or hysteresis aspects (e.g., to reduce the overall number of alignment steps or commands in relation to the transceiver device 202). The network device 206 may further be configured to recognize the alignment scheduling of other transceiver devices in the evaluation algorithm (e.g., to determine how to grant any alignment changes requested by the transceiver device 202: immediately, step-wise delayed, not at all, etc.).

Figure 8:
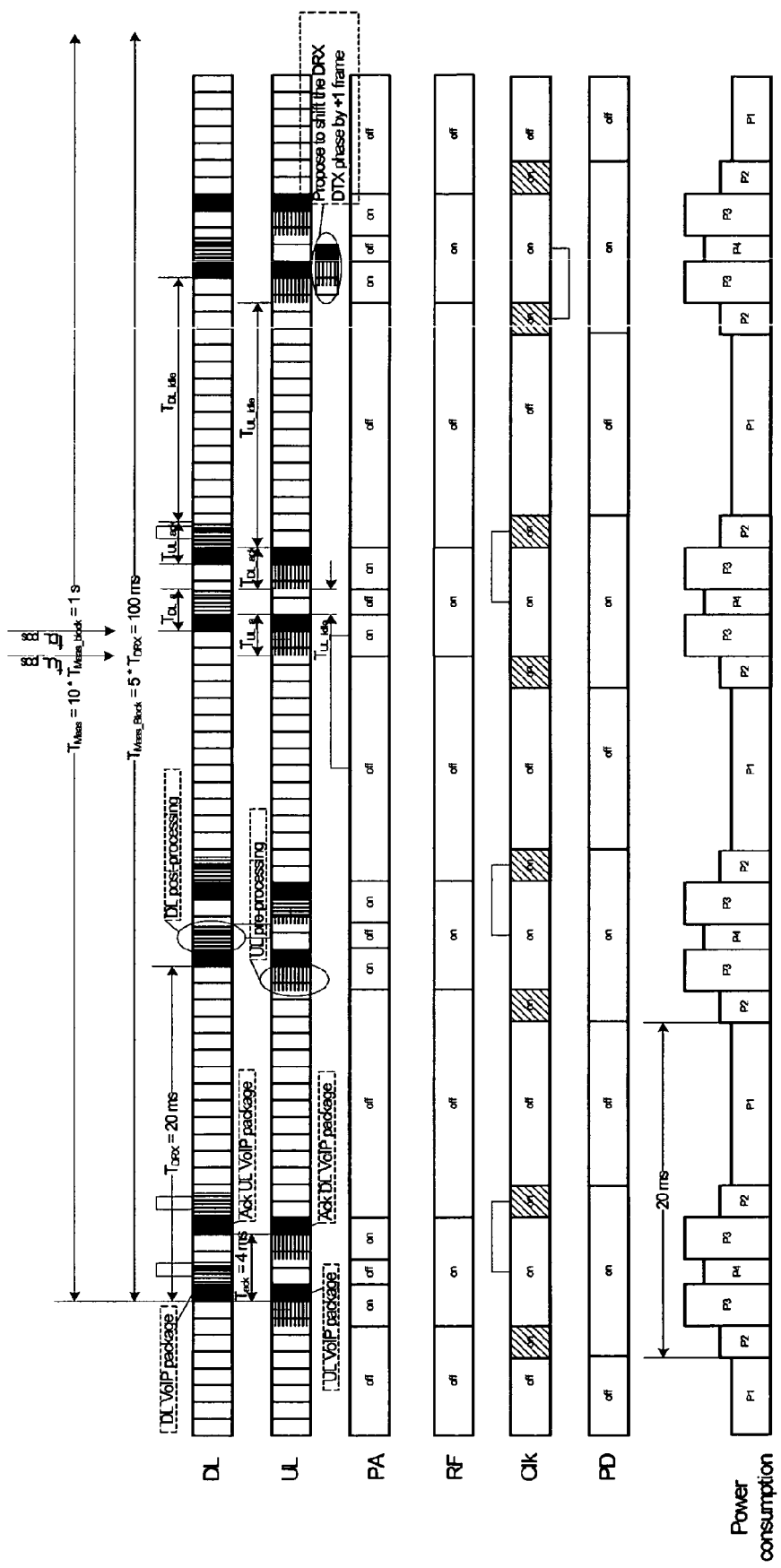
FIG. 8 is a schematic diagram illustrating the result of aligning DTX pauses and DRX pauses in combination with the initiation of power saving measures in accordance with a method embodiment.

The result of an optimal alignment of $t_{DL\_pos}$ and $t_{UL\_pos}$ is illustrated in FIG. 8. With the DTX characteristics settings and DRX characteristics settings illustrated in FIG. 8, the DTX pauses and DRX pauses (i.e., the DTX idle periods and the DRX idle periods) have essentially been aligned. This alignment permits the initiation of various power saving measures on the side of the transceiver device 202. Several possible examples are shown in FIG. 8, such as temporarily switching of the PA 308, the RF front end 304, a clocking mechanism as well as one or more power domains (see FIG. 3) while the DTX pauses and the DRX pauses are aligned. Consequently, the total power consumption of the transceiver device can be reduced. In FIG. 8 this reduced power consumption becomes apparent from the longer duration of the lowest power consumption level P1 compared to the aligned scenario illustrated in FIG. 6. Calculations have shown that the total power consumption of the hardware platform 300 can be reduced by a factor of almost 10 under favorable conditions compared to severely mis-aligned scenarios as illustrated in FIG. 6.

Moreover, the network device 206 may initiate optional further power management steps dependent on the currently signaled values of the IE vPowSupply and the IE vIdlePhase. Should, for example, the network device 206 detect a low power supply status on the side of the transceiver device 202, it may initiate various power saving measures. As an example, the network device 206 may change the current transmission channel bandwidth, the current bit rate (e.g., by changing the present Transport Format Combination, TFC), the present transmission mode (e.g., by switching from duplex to simplex half duplex), and to enter a voice activation mode (i.e., to introduce silence periods). The network device 206 may further decide to re-schedule the transceiver device 202 in its present cell to optimize the power consumption of the transceiver device 202. Moreover, Downlink Control Information (DCI) handling may additionally take into account a need on the side of the terminal device 202 for a reduced power consumption.

The alignment phase 508 in FIG. 5 may be aborted by the network device 206 at any time by sending a corresponding stop signal (PowerConsumptionMeasurmentsStop_Req) in a final phase 510 (see FIG. 5) to the transceiver device. This stop signal is acknowledged by the transceiver device 202 with a corresponding confirmation signal (PowerConsumptionMeasurmentsStop_Cfm).

As has become apparent from the above description of preferred embodiments, the technique presented herein allows for an efficient alignment of the DTX and DRX pauses. The aligned DTX and DRX pauses may be exploited by the transceiver device 202 to implement power saving measures (e.g., by switching off individual components or power domains of the hardware platform 300). Such a power management approach is particularly useful in case the transceiver device 202 is in need of a reduced power consumption.

The technique presented herein is further advantageous in that it provides a signaling procedure to inform the network device 206 of an idleness status and/or a power supply status of the transceiver device 202. The corresponding idleness status and/or power supply status information may be exploited by the network device 206 (e.g., to determine whether or not an alignment procedure should actually be initiated or whether to initiate power management measures).

While the current disclosure has been described in relation to its preferred embodiments, it is to be understood that this description is for illustrative purposes only. Accordingly, it is intended that the present invention be limited only by the scope of the claims appended hereto.

The invention claimed is:

1. A method by a network device for controlling a transceiver device of a wireless communication network, the method comprising:
  determining whether a temporal mismatch exists between discontinuous transmission (DTX) characteristics and discontinuous reception (DRX) characteristics of the transceiver device by analyzing a mismatch indication signal received from the transceiver device;
  wherein the mismatch indication signal comprises an indication of:
  a direction of the mismatch between the DTX characteristics and the DRX characteristics; and
  an amount of the mismatch between the DTX characteristics and the DRX characteristics;
  controlling the transceiver device to adjust at least one of its DTX characteristics and its DRX characteristics based on the mismatch indication signal to substantially align DTX pauses with DRX pauses.

2. The method of claim 1:
  wherein the DTX characteristics define reference characteristics;
  wherein the transceiver device is controlled to adjust the DRX characteristics relative to the DTX characteristics.

3. The method of claim 1 wherein the mismatch indication signal is further indicative of an incremental adjustment of at least one of the DTX characteristics and the DRX characteristics.

4. The method of claim 1 wherein controlling the transceiver device comprises transmitting at least one timing control signal to the transceiver device.

5. The method of claim 4 wherein the at least one timing control signal comprises at least one of an uplink scheduling grant and a downlink scheduling indication.

6. The method of claim 1 further comprising receiving a capability information signal from the transceiver device, the capability information signal indicating at least one of power management capabilities and capabilities of the transceiver device to adjust at least one of its DTX characteristics and its DRX characteristics.

7. The method of claim 1 further comprising determining that the transceiver device is in need of reduced power consumption, and, in response to this determination, initiating at least one of:
  adjusting at least one of a transmission channel bandwidth, a bit rate, a transmission mode, and a voice activation mode in accordance with a power consumption reduction scheme; and
  initiating controlling of the transceiver device to adjust at least one of its DTX characteristics and its DRX characteristics.

8. The method of claim 7 wherein the determining that the transceiver device is in need of reduced power consumption comprises receiving, from the transceiver device, at least one of:
  a power control request signal;
  a power consumption measurement report;
  an idleness status report;
  a power status report.

9. The method of claim 1 wherein the method is selectively performed for low bit rate services.

10. A method by a transceiver device for controlling the transceiver device of a wireless communication network, the method comprising:
  determining a temporal mismatch between discontinuous transmission (DTX) characteristics and discontinuous reception (DRX) characteristics of the transceiver device and generating a mismatch indication signal;
  wherein the mismatch indication signal comprises an indication of:
  a direction of the mismatch between the DTX characteristics and the DRX characteristics; and
  an amount of the mismatch between the DTX characteristics and the DRX characteristics;
  transmitting the mismatch indication signal towards a network device;
  adjusting at least one of the DTX characteristics and the DRX characteristics under control of the network device responsive to the mismatch indication signal to substantially align DTX pauses with DRX pauses.

11. The method of claim 10 wherein the DTX characteristics define reference characteristics, and wherein the DRX characteristics are adjusted relative to the DTX characteristics.

12. The method of claim 10 further comprising temporarily reducing power consumption of the transceiver device during the substantially aligned DTX and DRX pauses.

13. The method of claim 12 wherein reducing the power consumption comprises voltage down-scaling and/or reducing the performance of at least one of:
  a power amplifier;
  a low-noise amplifier;
  a radio front-end;
  a clocking mechanism;
  a radio signal processing integrated circuit;
  a discrete power domain.

14. The method of claim 10 further comprising adjusting at least one of a transmission channel bandwidth, a bit rate, a transmission mode, and a voice activation mode in accordance with a power consumption reduction scheme.

15. The method of claim 10 wherein the mismatch indication signal is further indicative of an incremental adjustment of at least one of the DTX characteristics and the DRX characteristics.

16. The method of claim 10 further comprising:
  receiving a timing control signal from a network device;
  adjusting at least one of the DTX characteristics and the DRX characteristics in accordance with the timing control signal.

17. The method of claim 10 further comprising transmitting a capability information signal to a network device, the capability information signal indicating at least one of power management capabilities and capabilities of the transceiver device to adjust at least one of its DTX characteristics and its DRX characteristics.

18. The method of claim 10 further comprising:
  determining at least one of a power consumption, an idleness status, and a power status of the transceiver device or one or more components thereof; and
  transmitting at least one of a power control request signal, a power consumption measurement report, idleness status report, and a power status report to the network device.

19. A computer program product stored in a non-transitory computer readable medium for controlling a transceiver device of a wireless communication network, the computer program product comprising software instructions which, when run on a computing device of a network device, causes the network device to:
  determine whether a temporal mismatch exists between discontinuous transmission (DTX) characteristics and discontinuous reception (DRX) characteristics of the transceiver device by analyzing a mismatch indication signal received from the transceiver device;
  wherein the mismatch indication signal comprises an indication of:
    a direction of the mismatch between the DTX characteristics and the DRX characteristics; and
    an amount of the mismatch between the DTX characteristics and the DRX characteristics;
  control the transceiver device to adjust at least one of its DTX characteristics and its DRX characteristics based on the mismatch indication signal to substantially align DTX pauses with DRX pauses.

20. A computer program product stored in a non-transitory computer readable medium for controlling a transceiver device of a wireless communication network, the computer program product comprising software instructions which, when run on a computing device of the transceiver device, causes the transceiver device to:
  determine a temporal mismatch between discontinuous transmission (DTX) characteristics and discontinuous reception (DRX) characteristics of the transceiver device and generating a mismatch indication signal;
  wherein the mismatch indication signal comprises an indication of:
    a direction of the mismatch between the DTX characteristics and the DRX characteristics; and
    an amount of the mismatch between the DTX characteristics and the DRX characteristics;
  transmit the mismatch indication signal towards a network device of the wireless communications network;
  adjust at least one of the DTX characteristics and the DRX characteristics under control of the network device responsive to the mismatch indication signal to substantially align DTX pauses with DRX pauses.

21. A network device configured to control a transceiver device of a wireless communication network, the network device comprising:
  a determinator configured to determine whether a temporal mismatch exists between discontinuous transmission (DTX) characteristics and discontinuous reception (DRX) characteristics of the transceiver device by analyzing a mismatch indication signal received from the transceiver device;
  wherein the mismatch indication signal comprises:
    an indication of a direction of the mismatch between the DTX characteristics and the DRX characteristics; and
    an of amount of the mismatch between the DTX characteristics and the DRX characteristics;
  a controller configured to control the transceiver device to adjust at least one of its DTX characteristics and its DRX characteristics based on the mismatch indication signal to substantially align DTX pauses with DRX pauses.

22. The network device of claim 21 wherein the network device is configured in accordance with Release 8 or higher of Third Generation Partnership Project (3GPP) specifications.

23. A transceiver device of a wireless communication network, the transceiver device comprising:
  a determinator configured to determine a temporal mismatch between discontinuous transmission (DTX) characteristics and discontinuous reception (DRX) characteristics of the transceiver device;
  wherein the transceiver device is further configured to generate a mismatch indication signal, and to transmit the mismatch indication signal towards a network device;
  wherein the mismatch indication signal comprises:
    an indication of a direction of the mismatch between the DTX characteristics and the DRX characteristics; and
    an amount of the mismatch between the DTX characteristics and the DRX characteristics;
  an adjustor configured to adjust at least one of the DTX characteristics and the DRX characteristics under control of the network device responsive the mismatch indication signal to substantially align DTX pauses with DRX pauses.

24. The transceiver device of claim 23 further comprising a power management unit configured to temporarily reduce a power consumption of the transceiver device during the substantially aligned DTX pauses and DRX pauses.

25. The transceiver device of claim 23 wherein the transceiver device is configured as a mobile telephone or a network access card.

* * * * *